Patented Aug. 11, 1953

2,648,703

UNITED STATES PATENT OFFICE 2,648,703

3-ETHOXYPROPYL 3-ETHOXYPROPIONATE

Harry A. Stansbury, Jr., and Raymond W. McNamee, Charleston, W. Va., assignors to Union Carbide and Carbon Corporation, a corporation of New York No Drawing. Application September 27, 1951,
Serial No. 248,641

3 Claims. (Cl. 260—484)

1

This invention relates to 3-ethoxypropyl 3-ethoxypropionate as a new chemical compound and a method of making it.

We have discovered that 3-ethoxypropyl 3-ethoxypropionate can be prepared by reacting 3-ethoxypropionaldehyde with itself in the presence of aluminum isopropoxide, $Al(OCH(CH_3)_2)_3$ as catalyst. In this process one molecule of 3-ethoxypropionaldehyde reacts with another as illustrated by the following general equation:

$2C_2H_5OCH_2CH_2CHO \longrightarrow$

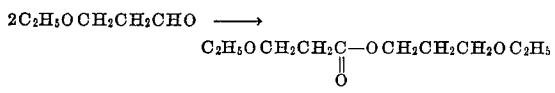

The reaction can be carried out merely by adding the ethoxypropionaldehyde to the aluminum isopropoxide dispersed in an inert diluent, as for instance benzene, toluene, xylene, ethyl benzene, diethyl ether, butyl ether, dioxane and the like. The addition is preferably performed gradually in small amounts over a period of time to control the reaction. By careful mixing of the aldehyde and the catalyst, the reaction can also be carried out in the absence of a diluent.

An amount of catalyst which is from 0.01 to 3.0 equivalents per mol of the 3-ethoxypropionaldehyde can be used. Preferably, an amount which is 0.3 equivalent per mol of the 3-ethoxypropionaldehyde should be used. Other aluminum alcoholates as, for instance, aluminum ethoxide can also be used as catalyst.

Preferably the reaction is carried out at a temperature of 20° to 40° C. Temperatures outside the preferred range as low as —10° C. or as high as 80° C. can also be used. However, at temperatures below the preferred range the rate of reaction is slow while at temperatures above the preferred range the aldehyde tends to enter into side reactions with consequent loss of material and the need of removing the side reaction products.

By reason of the structure of 3-ethoxypropyl-3-ethoxypropionate which includes two simple ether linkages together with the ester group having a compound ether group, utility as a solvent for a variety of resins and resinous materials is indicated. It is an excellent high-boiling solvent for nitrocellulose. The ester is also an intermediate for the production of 3-ethoxypropylacrylate which in turn forms polymers and copolymers which tend to cross-link even without the addition of catalyst for cross-linking.

The invention is further illustrated by the following example:

2

*Example*

To a well stirred mixture of 200 grams of benzene and 21 grams (0.3 equivalent) of aluminum isopropoxide, $Al(OCH(CH_3)_2)_3$, maintained at a temperature of 25° to 35° C. was added dropwise, over a period of 15 minutes, 102 grams (1 mol) of 3-ethoxypropionaldehyde. Following the addition the reaction mixture was maintained at a temperature of 25° C. for a period of two hours, with stirring. Thereafter, a solution of 40 grams (0.4 equivalent) of concentrated hydrochloric acid in 200 milliliters of water was added, dropwise, to destroy the aluminum propoxide catalyst. The oil which separated was washed with 100 milliliters of water and distilled under reduced pressure. There was obtained 75 grams of 3-ethoxypropyl 3-ethoxypropionate, characterized by the following properties: boiling point, 105° C. at an absolute pressure of 7 millimeters of mercury; specific gravity, 20/20° C., 0.970; $n_D^{30}$, 1.4177. The equivalent weight as ester was 207 (theory, 204) and the molecular weight was 208 (theory, 204). The yield was 74 per cent and the efficiency 82 per cent.

What is claimed is:

1. A process of making 3-ethoxypropyl 3-ethoxypropionate which consists in reacting 3-ethoxypropionaldehyde in the presence of aluminum isopropoxide as catalyst at a temperature of —10° to 80° C.

2. A process of making 3-ethoxypropyl 3-ethoxypropionate which consists in reacting 3-ethoxypropionaldehyde in the presence of aluminum isopropoxide as catalyst at a temperature of 20° to 40° C.

3. A process of making 3-ethoxypropyl 3-ethoxypropionate which consists in reacting 3-ethoxypropionaldehyde in the presence of aluminum alkoxide as catalyst at a temperature of 20° to 40° C.

HARRY A. STANSBURY, JR.
RAYMOND W. McNAMEE.

References Cited in the file of this patent

UNITED STATES PATENTS

| Number | Name | Date |
|---|---|---|
| 2,501,151 | Rehberg | Apr. 18, 1950 |

OTHER REFERENCES

Rehberg, Jour. Am. Chem. Soc. 72, 2205–2206 (1950).